(12) United States Patent
Hayashi et al.

(10) Patent No.: US 6,255,537 B1
(45) Date of Patent: Jul. 3, 2001

(54) PROCESS FOR PREPARING POLY (ALKYLENE OXIDE)

(75) Inventors: Takaomi Hayashi; Katsuhiko Funaki; Atsushi Shibahara; Kazumi Mizutani; Isao Hara; Shinji Kiyono; Tadahito Nobori; Usaji Takaki, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/289,990

(22) Filed: Apr. 13, 1999

(30) Foreign Application Priority Data

Apr. 16, 1998 (JP) .................................................. 106745

(51) Int. Cl.⁷ .............................. C07C 43/13; C07C 43/11
(52) U.S. Cl. ...................... 568/622; 568/606; 568/613; 568/623; 568/624; 502/162; 502/164; 502/167; 502/200; 502/208
(58) Field of Search ..................................... 568/606, 622, 568/623, 624, 613; 502/200, 208, 162, 164, 167

(56) References Cited

U.S. PATENT DOCUMENTS

| | | | |
|---|---|---|---|
| 5,693,584 | 12/1997 | Le-Khac ................................ | 502/175 |
| 6,077,930 | * 6/2000 | Norbori et al. ....................... | 528/354 |

FOREIGN PATENT DOCUMENTS

| | | | |
|---|---|---|---|
| 76355555 A2 | 3/1997 | (EP) ............................... | C08G/65/26 |
| 0 763 555 A2 | * 3/1997 | (EP) ............................... | C08G/65/26 |
| 07991600 A1 | 8/1997 | (EP) ................................. | C07F/9/06 |
| 2 187 454 | * 9/1987 | (GB) .............................. | C07C/41/03 |

OTHER PUBLICATIONS

Koidan et al., Methylation . . . Iodide, J. of Gen. Chem. of the USSR, vol. 55, No. 7, Pt. 2, p. 1453, Jul. 1985.*

* cited by examiner

Primary Examiner—Rosalynd Keys
(74) Attorney, Agent, or Firm—Burns, Doane, Swecker, & Mathis, L.L.P.

(57) ABSTRACT

There is provided a process for preparing a poly(alkylene oxide) by using a polymerization initiator which does not cause any problem on preparing and handling in the preparation of the polyalkylene oxide by polymerizing an alkylene oxide compound and does not require a special treatment before the initiation of the polymerization. That is, it is a process of polymerizing the alkylene oxide compound in the presence of a phosphine oxide compound represented by the formula (1):

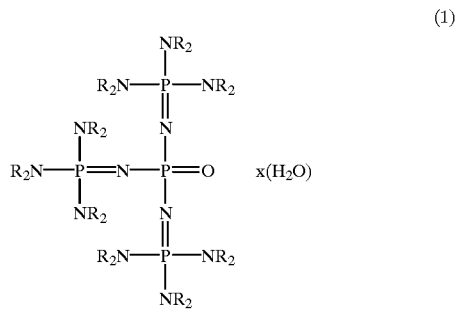

(1)

wherein R is the same or different and each represents a hydrocarbon group having 1 to 10 carbon atoms, and x represents an amount of water molecules contained in terms of a molar ratio and is within a range from 0 to 5.0, or in the presence of said phosphine oxide compound and an active hydrogen compound selected from water or an organic compound having a partial structural formula —OH or —NH—.

36 Claims, No Drawings

PROCESS FOR PREPARING POLY(ALKYLENE OXIDE)

BACKGROUND OF THE INVENTION

1. Field of the Invention

The present invention relates to a process for preparing a poly(alkylene oxide) by polymerizing an alkylene oxide. The poly(alkylene oxide) is an important polymer which is used as a raw material of polyurethane foam, elastomer, etc. by reacting with an isocyanate compound or a surfactant.

2. Description of the Prior Art

In the preparation of a poly(alkylene oxide) by polymerizing an alkylene compound, it is most popular that the hydration reaction between an active hydrogen compound such as polyhydric alcohol and a basic alkali metal compound such as potassium hydroxide is conducted before the initiation of the polymerization to form an alkali metal salt of the active hydrogen compound, which is used as an initiator. This process has already been put into practical use, industrially. With respect to a combination other than this combination of the initiator, U.S. Pat. No. 3,829,505 discloses that a polymer of propylene oxide is obtained by using an active hydrogen compound and a compound represented by $Zn_3[Fe(CN)_6]_2 \cdot H_2O \cdot$dioxane. Japanese Patent Kokai (Laid-Open) Publication No. 276821/1990 discloses that a polymer is obtained by reacting a polyol prepared in the presence of a zinc hexacyanocobaltate complex with sodium methylate and polymerizing the reaction product with ethylene oxide. Japanese Patent Kokai (Laid-Open) Publication No. 232433/1987 discloses that a polymer is obtained by polymerizing ethylene oxide using a product obtained by adding a hexane solution of diethylzinc to a dispersion prepared by adding 1,4-butanediol and a nonionic surfactant to a hexane slurry of fumed silica. However, all of these polymers contain metallic components and an adverse influence is exerted on the reaction in the preparation of a polyurethane or physical properties of the polyurethane when these metallic components are remained in the formed poly(alkylene oxide). Therefore, in the preparation of the polyalkylene oxide, a special process or complicated step of sufficiently removing these metallic components is required.

In Japanese Patent Kokai (Laid-Open) Publication No. 159595/1975, a polymer of ethylene oxide is obtained by using, as a metal free initiator, a combination of an alkanepolyol as the active hydrogen compound and an ether adduct of boron trifluoride. Also with respect to this initiator, however, it is known that impurities in the polymer exert an adverse influence on physical properties of the polyurethane and, therefore, a complicated step is required to sufficiently remove impurities. In Japanese Patent Kokai (Laid-Open) Publication No. 12026/1982, a polymer of an alkylene oxide is obtained by using alcohols and aminophenol. In Japanese Patent Kokai (Laid-Open) Publication No. 38323/1981, a propylene oxide is polymerized by using sorbitol and tetramethyl ammonium hydroxide. However, all processes have a problem that a polymerization activity is insufficient and an odor of an amine compound is remained.

There has also been known a process for preparing a poly(alkylene oxide) by polymerizing an alkylene oxide compound in the presence of a phosphazene compound and an active hydrogen compound (EP0763555; Macromol. Rapid Commun., Vol. 17, pages 143–148, 1996; and Macromol. Symp., Vol. 107, pages 331–340, 1996).

The phosphazene compound in this process is an initiator having strong basicity, but is not at all industrially advantageous because a complicated step is required to synthesize the phosphazene compound and a stronger basic compound must be used to afford strong basicity. There is also a problem on handling that the phosphazene compound is liable to cause a change of properties by a carbon dioxide in an air because of its strong basicity.

EP0791600 discloses a process for preparing a poly(alkylene oxide) by substantially polymerizing an alkylene oxide compound in the presence of a phosphazenium salt of an active hydrogen compound. This process requires that the phosphazenium salt of the active hydrogen compound is formed by the dehydration or desalting reaction of a phosphazenium hydroxide with an active hydrogen compound or of a phosphazenium halide with an alkaline metal salt of the active hydrogen compound before the initiation of the polymerization. An inorganic salt or water formed in that case can inhibit smooth proceeding of the polymerization, sometimes, and it becomes complicated to remove the inorganic salt and, therefore, an improvement is industrially required.

SUMMARY OF THE INVENTION

An object of the present invention is to provide a process for preparing a poly(alkylene oxide) which does not contain any metallic component and does not leave an odor, simply and efficiently, by using a polymerization initiator which does not cause any problem on preparing and handling in the preparation of the poly(alkylene oxide) by polymerizing an alkylene oxide compound and does not require a special treatment before the initiation of the polymerization.

The present inventors have studied intensively. As a result, they have found that an initiator containing a phosphine oxide compound represented by the formula (1), or said phosphine oxide compound and water or an organic compound having a specific partial structure can serve as an effective initiator which answers the above object. Thus, the present invention has been accomplished.

That is, the present invention provides a process for preparing a poly(alkylene oxide) by polymerizing an alkylene oxide compound, which comprises polymerizing the alkylene oxide compound in the presence of a phosphine oxide compound represented by the formula (1):

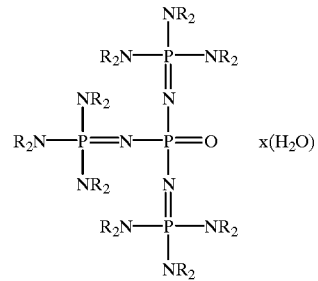

(1)

wherein R is the same or different and each represents a hydrocarbon group having 1 to 10 carbon atoms, and x represents an amount of water molecules contained in terms of a molar ratio and is within a range from 0 to 5.0, or in the presence of said phosphine oxide compound and an active hydrogen compound selected from water or an organic compound having a partial structural formula —OH or —NH—.

DETAILED DESCRIPTION OF THE INVENTION

Formula (1) is a limiting structure for a phosphine oxide used in the process of this invention, where phosphorus and oxygen atoms are bound via a double bond. Alternatively, the compound may have a limiting structure where electrons are localized on the oxygen atom to form an anion while the phosphorous has a cationic form, i.e., $P^+$—$O^-$. The positive charge on the phosphorus atom is delocalized over the molecule via a conjugated system. It should be, therefore, noted that the phosphine oxide represented by the formula (1) is a resonance hybrid including all the limiting structures. When the phosphine oxide compound represented by the formula (1) contains water, an interaction between water and the phosphine oxide compound may be any one as far as it does not eliminate characteristics of the phosphine oxide compound and does not inhibit the process of the present invention.

In the process of the present invention, the phosphine oxide compound represented by the formula (1) may react with an alkylene oxide compound and/or an active hydrogen compound to form a derivative of the phosphine oxide compound, and the derivative may serve as a polymerization initiator. When such a derivative of the phosphine oxide compound is prepared previously or separately and is used for polymerization of the alkylene oxide compound, that idea is also included in an idea of the present invention that an alkylene oxide compound is polymerized in the presence of a phosphine oxide compound represented by the formula (1), or in the presence of the phosphine oxide compound and an active hydrogen compound selected from water or an organic compound having a partial structural formula —OH or —NH—.

The alkylene oxide compound in the process of the present invention includes epoxy compounds, such as ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether, phenyl glycidyl ether or the like. Two or more kinds of them may also be used in combination. When using them in combination, a process of using a plurality of alkylene oxide compounds at the same time, a process of using them in combination in order, or a process of repeating the order can be used.

Among these alkylene oxide compounds, for example, ethylene oxide, propylene oxide, 1,2-butylene oxide and styrene oxide are preferred, and ethylene oxide and propylene oxide are more preferred. Propylene oxide is still more preferred.

R in the phosphine compound represented by the formula (1) in the process of the present invention may be the same or different and each represents a hydrocarbon group having 1 to 10 carbon atoms. Specifically, R is selected from an aliphatic or aromatic hydrocarbon group, such as methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (popular name: tert-octyl), nonyl, decyl, phenyl, 4-tolyl, benzyl, 1-phenylethyl, 2-phenylethyl or the like.

Among these examples of R, for example, the same or different aliphatic hydrocarbon group having 1 to 8 carbon atoms, such as methyl, ethyl, n-propyl, isopropyl, tert-butyl, tert-pentyl, 1,1-dimethyl-3,3-dimethylbutyl or the like is preferred, and methyl group or ethyl group is more preferred.

These phosphine oxide compounds represented by the formula (1) can be synthesized by a process described in G.N. Koidan et al., Journal of General Chemistry of the USSR, Vol. 55, page 1453 (1985) or a process similar to the process.

These phosphine oxide compounds represented by the formula (1) are usually liable to be converted into a water-containing compound thereof or a hydrate because of its moisture absorption properties. The symbol x representing the amount of water molecules contained in the compound is a molar ratio based on the phosphine oxide, and is within a range from 0 to 5.0, preferably from 0 to 2.0.

The active hydrogen compound in the process of the present invention is a compound containing active hydrogen atom, and is a compound selected from water or an organic compound having a partial structural formula —OH or —NH—.

First, the active hydrogen compound is water. The organic compound having a partial structural formula —OH includes, for example, carboxylic acids having 1 to 20 carbon atoms, such as formic acid, acetic acid, propionic acid, butyric acid, isobutyric acid, lauric acid, stearic acid, oleic acid, phenylacetic acid, dihydrocinnamic acid or cyclohexanecarboxylic acid, benzoic acid, paramethylbenozic acid, 2-carboxynaphthalene, etc.; polycarboxylic acids having 2 to 20 carbon atoms and having 2 to 6 carboxyl groups, such as oxalic acid, malonic acid, succinic acid, maleic acid, fumaric acid, adipic acid, itaconic acid, butanetetracarboxylic acid, phthalic acid, isophthalic acid, terephthalic acid, trimellitic acid, pyromellitic acid, etc.; carbamic acids such as N,N-diethylcarbamic acid, N-carboxypyrrolidone, N-carboxyaniline, N,N'-dicarboxy-2,4-toluenediamine, etc.; alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alcohol, etc.; polyhydric alcohols having 2 to 20 carbon atoms and having 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerin, diglycerin, trimethylolmelamine, pentaerythritol, dipentaerythritol, etc.; saccharides or derivatives thereof, such as glucose, sorbitol, dextrose, fructose, sucrose, etc.; aromatic compounds having 6 to 20 carbon atoms and having 1 to 3 hydroxyl groups, such as phenol, 2-naphthol, 2,6-dihydroxynaphthalene, bisphenol A, etc.; and poly(alkylene oxides) having 2 to 8 terminal ends, which have 1 to 8 hydroxyl groups at the terminal end thereof and have a number-average molecular weight of 200 to 50,000, such as poly(ethylene oxide), poly(propylene oxide) or copolymers thereof.

The organic compound having a partial structural formula —NH— as the active hydrogen compound includes, for example, aliphatic or aromatic primary amines having 1 to 20 carbon atoms, such as methylamine, ethylamine, n-propylamine, isopropylamine, n-butylamine, isobutylamine, sec-butylamine, tert-butylamine, cyclohexylamine, benzylamine, β-phenylethylamine, aniline, o-toluidine, m-toluidine, p-toluidine, etc.; aliphatic or aromatic secondary amines having 2 to 20 carbon atoms, such as diethylamine, methylethylamine, diethylamine, di-n-propylamine, ethyl-n-butylamine, methyl-sec-butylamine, dipentylamine, dicyclohexylamine, N-methylaniline, diphenylamine, etc.; polyamines having 2 to 20 carbon atoms and having 2 to 3 primary or secondary amino groups, such as ethylenediamine, di(2-aminoethyl)

amine, hexamethylenediamine, 4,4'-diaminodiphenylmethane, melamine, tri(2-aminoethyl) amine, N,N'-dimethylethylenediamine, di(2-methylaminoethyl)amine, etc.; saturated cyclic secondary amines having 4 to 20 carbon atoms, such as pyrrolidine, piperidine, morpholine, 1,2,3,4-tetrahydroquinoline, etc.; unsaturated cyclic secondary amines having 4 to 20 carbon atoms, such as 3-pyrroline, pyrrole, indol, carbazole, imidazole, pyrazole, purine, etc.; cyclic polyamines having 4 to 20 carbon atoms and having 2 to 3 secondary amino groups, such as piperazine, pyrazine, 1,4,7-triazacyclononane, etc.; non-substituted or N-monosubstituted acid amides having 2 to 20 carbon atoms, such as acetamide, propionamide, N-methylpropionamide, N-methylbenzoic acid amide, N-ethylstearic acid amide, etc.; 5- to 7-membered cyclic amides such as 2-pyrrolidone, ε-caprolactam, etc.; and imides of dicarboxylic acid having 4 to 10 carbon atoms, such as succinimide, maleimide, phthalimide, etc.

Those having a plurality of active hydrogen atoms are included in the above active hydrogen compound. Usually, the polymerization occurs from the anion portion where all active hydrogen atoms are eliminated as protons.

Among these active hydrogen compounds, preferred compound having a partial structural formula —OH includes, for example, alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alcohol, etc.; polyhydric alcohols having 2 to 20 carbon atoms and having 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerin, diglycerin, trimethylolmelamine, pentaerythritol, dipentaerythritol, etc.; saccharides or derivatives thereof, such as glucose, sorbitol, dextrose, fructose, sucrose, etc.; and poly(alkylene oxides) having 2 to 8 terminal ends, which have 1 to 8 hydroxyl groups at the terminal end thereof and have a number-average molecular weight of 200 to 50,000, such as poly (ethylene oxide), poly(propylene oxide) or copolymers thereof.

Preferred organic compound having a partial structural formula —NH—includes, for example, polyamines having 2 to 20 carbon atoms and having 2 to 3 primary or secondary amino groups, such as ethylenediamine, di(2-aminoethyl) amine, hexamethylenediamine, 4,4'-diaminodiphenylethane, tri(2-aminoethyl)amine, N,N'-dimethylethylenediamine, N,N'-diethylethylenediamine, di(2-methylaminoethyl)amine, etc.; saturated cyclic secondary amines having 4 to 10 carbon atoms, such as pyrrolidine, piperidine, morpholine, 1,2,3,4-tetrahydroquinoline, etc.; and cyclic polyamines having 4 to 10 carbon atoms and having 2 to 3 secondary amino groups, such as piperazine, pyrazine, 1,4,7-triazacyclononane, etc.

More preferably, the active hydrogen compound is an organic compound having a partial structural formula —OH which includes, for example, polyhydric alcohols having 2 to 20 carbon atoms and having 2 to 8 hydroxyl groups, such as ethylene glycol, propylene glycol, 1,4-butanediol, trimethylolpropane, glycerin, pentaerythritol, dipentaerythritol, etc.; saccharides or derivatives thereof, such as glucose, sorbitol, dextrose, fructose, sucrose, etc.; and poly(alkylene oxide)s having 2 to 6 terminal ends, which have 2 to 6 hydroxyl groups at the terminal end thereof and have a number-average molecular weight of 200 to 10,000, such as poly(ethylene oxide), poly(propylene oxide) or copolymers thereof.

In the process of the present invention, the amount of the phosphine oxide compound represented by the formula (1) to be used is not specifically limited, but is usually within a range from $1 \times 10^{-15}$ to $5 \times 10^{-1}$ mol. and preferably from $1 \times 10^{-7}$ to $1 \times 10^{-1}$ mol, per mol of the alkylene oxide compound.

In the process of the present invention, the amount of the active hydrogen compound to be used is not specifically limited, but is usually within a range from 1 to $1 \times 10^5$ mol, preferably form 5 to $1 \times 10^4$ mol and more preferably from 10 to $1 \times 10^3$ mol, per mol of the phosphine oxide compound represented by the formula (1).

The type of the polymerization reaction in the process of the present invention is not specifically limited. Usually, there can be used a process of supplying an alkylene oxide compound at once, intermittently or continuously, to a reaction vessel in which a phosphine oxide compound represented by the formula (1) or the phosphine oxide compound and an active hydrogen compound are charged, together with a solvent when used.

The reaction temperature of the polymerization reaction in the process of the present invention varies depending on the kind or amount of the alkylene oxide compound to be used, the phosphine oxide compound represented by the formula (1), and the active hydrogen compound when used, but is usually not more than 150° C., preferably within a range from 10 to 130° C., and more preferably from 50 to 120° C. The reaction pressure varies depending on the kind or amount of the alkylene oxide compound to be used, and the active hydrogen compound when used, or the polymerization temperature, but the polymerization reaction pressure is usually not more than 3.0 MPa (absolute pressure represented by megapascal, the same shall apply hereinafter), preferably within a range from 0.01 to 1.5 MPa, and more preferably from 0.1 to 1.0 MPa. The reaction time varies depending on the kind or amount of the substances to be used or the polymerization temperature or pressure, but is usually not more than 70 hours, preferably within a range from 0.1 to 30 hours, and more preferably from 0.5 to 24 hours.

In the process of the present invention, two or more alkylene oxide compounds can also be used in combination. When the polymerization is conducted by using a plurality of alkylene oxide compounds in combination at the same time, a copolymer having comparatively large randomness can be obtained, although it depends on a difference in reactivity of the compounds. When two or more alkylene oxide compounds are polymerized in order, a block copolymer containing a block of two or more polyalkylene oxide compounds can be obtained. For example, when a second kind of an alkylene oxide compound is polymerized as it is after the completion of the polymerization reaction of a first kind of an alkylene oxide compound, a block copolymer containing two kinds of blocks can be obtained. After the completion of the polymerization reaction of the second kind of the alkylene oxide compound, when the original first kind of the alkylene oxide compound is polymerized or the polymerization is repeated, an alternating block copolymer can be obtained. When three or more alkylene oxide compounds are used in combination in such way, more complicated block copolymers can be obtained. Among these copolymers, a block copolymer containing a block of poly (propylene oxide) and poly(ethylene oxide), which is obtained by polymerizing propylene oxide and ethylene oxide in order, is preferred.

In the polymerization reaction of the present invention, a solvent can also be used, if necessary. The solvent to be used includes, for example, aliphatic hydrocarbons such as pentane, hexane, heptane, cyclohexane, etc.; aromatic hydrocarbons such as benzene, toluene, etc.; ethers such as diethyl ether, tetrahydrofuran, 1,3-dioxane, anisole, etc.; and aprotic polar solvents such as dimethyl sulfoxide, N,N-dimethylformamide, hexamethylphosphoramide, N,N'-dimethylimidazolidinone, etc. In addition to them, any solvent can also be used as long as it does not inhibit the polymerization reaction of the process of the present invention. The polymerization reaction in the process of the present invention can also be carried out in the presence of an inert gas such as nitrogen, argon or the like, if necessary.

The poly(alkylene oxide) obtained by the process of the present invention can be used as it is as a raw material of polyurethane foam, elastomer, etc., or a surfactant, only by removing a solvent when using the solvent in the polymerization reaction. Usually, it can also be used after treating with a mineral acid such as hydrochloric acid, phosphoric acid, sulfuric acid, etc.; organic carboxylic acid such as formic acid, acetic acid, propionic acid, etc.; and carbon dioxide, acid type ion exchange resin, etc. Normal purification can also be conducted, for example, by washing with water, an organic solvent or a mixture thereof.

EXAMPLES

The following Examples further illustrate the present invention in detail, but these Examples are illustrative and not restrictive.

Example 1

In a 400 ml pressure vessel equipped with a temperature measuring tube, a pressure gauge, a stirrer and an alkylene oxide introducing tube, 1.45 g (2.50 mmol) of tris[tris(dimethylamino)phosphoranylideneamino] phosphine oxide $\{[(Me_2N)_3P=N-]_3P=O \cdot 0.29(H_2O)\}$ (Me represents a methyl group, the same shall apply hereinafter) as a phosphine oxide compound represented by the formula (1), which contains 0.9% by weight of water, that is x is 0.29 in terms of a molar ratio, and 19.8 g (215 mmol) of glycerin were charged. After the atmosphere in the system was replaced by nitrogen, the temperature was raised to 80° C. Then, 186 g (3.20 mol) of propylene oxide was continuously supplied over 5 hours so that the reaction pressure does not exceed 0.4 MPa (absolute pressure represented by megapascal, the same shall apply hereinafter). After completion of supply of propylene oxide, the mixture was reacted at 80° C. for 12 hours. The pressure was lowered to 0.12 MPa. After purging the residual pressure with supplying nitrogen to the vapor phase portion, the contents were transferred to a separate vessel and a low-boiling fraction was removed by maintaining under reduced pressure of 10 mmHg at 80° C. for 30 minutes. Then, the pressure was returned to a normal pressure by using nitrogen, followed by cooling to room temperature. As a result, 202 g of transparent liquid polyoxypropylenetriol oxide free from odor was obtained. A hydroxyl value (obtained by reducing the amount of terminal hydroxyl group in 1 g of polymer in terms of KOH mg, KOH mg/g polymer, the same shall apply hereinafter) of this polymer was 181 and a number-average molecular weight calculated from the hydroxyl value was 930. According to gel permeation chromatography using poly(ethylene oxide) as a standard, a molecular weight distribution (Mw/Mn, the same shall apply hereinafter) was 1.05.

Comparative Example 1

The same charging operation as in Example 1 was repeated, except for using no tris[tris(dimethylamino)phosphoranylideneamino] phosphine oxide. Consumption of propylene oxide was not observed and the supply was terminated at the time when 105 g (1.81 mol) of propylene oxide was incorporated. After maintaining at 80° C. for 12 hours, the same operation as in Example 1 was conducted. The amount of the contents in the reaction vessel was 20.3 g and was almost the same as the weight of glycerin itself charged. Polyoxypropylene was not obtained.

Example 2

The same manner as in Example 1 was repeated, except that 31.9 g of polyoxypropylenetriol containing the catalyst component obtained in Example 1 was charged in the reaction vessel in place of the phosphine compound and glycerin used in Example 1 and 197 g (3.39 mol) of propylene oxide was supplied over 5 hours and that the reaction time was changed to 20 hours. As a result, 226 g of transparent odorless polyoxypropylenetriol was obtained and the hydroxyl value was 26.7. The number-average molecular weight calculated from the hydroxyl value was 6300. A total unsaturation degree (milliequivalent of unsaturated group in 1 g of polymer, unsaturated group meq/g polymer, the same shall apply hereinafter) representing the amount of terminal unsaturated monool as by-products contained in this polymer was 0.020. The molecular weight distribution was 1.05.

Example 3

The same manner as in Example 2 was repeated, except that 70.4 g of polyoxypropylenetriol containing the catalyst component obtained in Example 2 was charged in place of polyoxypropylenetriol containing the catalyst component obtained in Example 1 and 140 g (2.41 mol) of propylene oxide was supplied. As a result, 199 g of transparent odorless polyoxypropylenetriol was obtained and the hydroxyl value was 11.0. The number-average molecular weight was 15300. A total unsaturation degree was 0.039.

Example 4

The same manner as in Example 1 was repeated, except that 100 g of polyoxypropylenetriol containing the catalyst component obtained in Example 1 was charged in place of the phosphine oxide compound and glycerin used in Example 1 and 101 g (2.30 mol) of ethylene oxide was supplied in place of propylene oxide over 4 hours and that the reaction time was changed to 8 hours. As a result, 198 g of a transparent odorless block copolymer of polyoxypropylenepolyoxyethylene triol was obtained. The hydroxyl value was 92.5 and the number-average molecular weight was 1820.

Example 5

The same manner as in Example 1 was repeated, except that 0.215 g (0.372 mmol) of tris[tris(dimethylamino)phosphoranylideneamino] phosphine oxide $\{[(Me_2N)_3P=N-]_3P=O\}$ containing substantially no water, which was dried sufficiently in a vacuum desiccator containing phosphorous pentaoxide as a desiccant, was used in place of the phosphine oxide compound used in Example 1 and 31.1 g of polyoxypropylenetriol (MN-1000, manufactured by Mitsui Chemical Co., Ltd.) having a hydroxyl value of 168 (number-average molecular weight: 1002) manufactured industrially in the presence of a potassium hydroxide catalyst was used in place of glycerin and that 200 g (3.44 mol) of propylene oxide was supplied and the reaction time was changed to 20 hours. As a result, 227 g of transparent odorless polyoxypropylenetriol was obtained. The hydroxyl value was 23.7 and the number-average molecular weight was 7100.

Example 6

The same manner as in Example 1 was repeated, except that 2.18 g (2.50 mmol) of bis[tris(dimethylamino)phosphoranylideneamino][tris(n-octylmethylamino)phosphoranylideneamino] phosphine oxide $\{[(Me_2N)_3P=N-]_2[(n-Oct(Me)N)_3P=N-]P=O\}$ (n-Oct represents a n-octyl group) containing substantially no water, which was dried sufficiently in a vacuum desiccator containing phosphorous pentaoxide as a desiccant, was used in place of the phosphine oxide compound used in Example 1. As a result, 207 g of transparent odorless polyoxypropylenetriol was obtained. The hydroxyl value was 179 and the number-average molecular weight was 940.

Example 7

The same manner as in Example 1 was repeated, except that 6.89 g (215 mmol) of methyl alcohol was used in place of glycerin used in Example 1 and the reaction time was changed to 19 hours. As a result, 192 g of transparent odorless polyoxypropylenemonool was obtained. The hydroxyl value was 3.7 and the number-average molecular weight was 880.

Example 8

The same manner as in Example 1 was repeated, except that 28.8 g (215 mmol) of dipropylene glycol was used in place of glycerin used in Example 1. As a result, 210 g of transparent odorless polyoxypropylenediol was obtained. The hydroxyl value was 119 and the number-average molecular weight was 940.

Example 9

The same manner as in Example 1 was repeated, except that 38.7 g (215 mmol) of glucose was used in place of glycerin used in Example 1. As a result, 222 g of transparent odorless polyoxypropylenepentaol was obtained. The hydroxyl value was 278 and the number-average molecular weight was 1010.

Example 10

The same manner as in Example 1 was repeated, except that 19.4 g (215 mmol) of 1,4-butanediol was used in place of glycerin used in Example 1 and 230 g (3.20 mol) of 1,2-butylene oxide was supplied in place of propylene oxide with maintaining under a pressure of not more than 0.3 MPa over 5 hours and that the reaction time was changed to 19 hours and the reaction temperature was changed to 100° C. As a result, 250 g of transparent odorless polyoxybutylenediol was obtained. The hydroxyl value was 98.4 and the number-average molecular weight was 1140.

Example 11

The same manner as in Example 1 was repeated, except that 300 g (2.50 mol) of styrene oxide was supplied in place of propylene oxide used in Example 1 with maintaining under a pressure of not more than 0.2 MPa over 5 hours and that the reaction time was changed to 20 hours and the reaction temperature was changed to 100° C. As a result, 320 g of transparent odorless polyoxystyrenetriol was obtained. The hydroxyl value was 118 and the number-average molecular weight was 1430.

Example 12

The same manner as in Example 1 was repeated, except that 12.9 g (215 mmol) of ethylenediamine was used in place of glycerin used in Example 1 and the reaction time was changed to 2 hours. As a result, 173 g of transparent odorless polyoxypropylenetetraol was obtained, although the reaction time was slightly shorter. The hydroxyl value was 281 and the number-average molecular weight was 798.

Example 13

The same manner as in Example 1 was repeated, except that 18.5 g (215 mmol) of piperazine was used in place of glycerin used in Example 1 and the reaction time was changed to 8 hours. As a result, 203 g of transparent odorless polyoxypropylenediol was obtained. The hydroxyl value was 121 and the number-average molecular weight was 927.

Example 14

The same manner as in Example 1 was repeated, except that 15.3 g (215 mmol) of pyrrolidine was used in place of glycerin used in Example 1 and the reaction time was changed to 8 hours. As a result, 201 g of transparent odorless polyoxypropylenemonool was obtained. The hydroxyl value was 61.3 and the number-average molecular weight was 915.

Example 15

In the same reaction vessel as in Example 1, 2.62 g (4.53 mmol) of tris[tris(dimethylamino)phosphoranylideneamino] phosphine oxide $\{[(Me_2N)_3P=N-]_3P=O\}$ containing substantially no water, which was dried sufficiently in a vacuum desiccator containing phosphorous pentaoxide as a desiccant, was charged. In this example no active hydrogen compound was used. After the atmosphere in the system was replaced by nitrogen, 52.0 g (0.895 mol) of propylene oxide was incorporated at a time and a temperature rise is initiated. After the temperature was maintained at about 80° C. for 3 hours, afterwards the same operation as in Example 1 was repeated. As a result, 50.8 g of transparent odorless polyoxypropylenemonool was obtained. The hydroxyl value was 5.91 and the number-average molecular weight was 9490.

Effect of the Invention

According to the process of the present invention, there can be prepared a poly(alkylene oxide) which does not contain any metallic component and does not leave an odor, capable of using, as a polymerization initiator, a specific phosphine oxide compound which does not cause any problem on preparing and handling in the preparation of the polyalkylene oxide by polymerizing an alkylene oxide compound and does not require a special treatment before the initiation of the polymerization.

What is claimed is:

1. A process for preparing a poly(alkylene oxide) by polymerizing an alkylene oxide compound, which comprises polymerizing the alkylene oxide compound in the presence of a phosphine oxide compound represented by the formula (1):

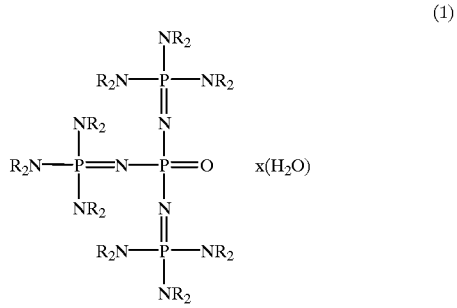

wherein R is the same or different and each represents a hydrocarbon group having 1 to 10 carbon atoms, and x represents an amount of water molecules contained in terms of a molar ratio and is within a range from 0 to 5.0, or in the presence of said phosphine oxide compound and an active hydrogen compound selected from water or an organic compound having a partial structural formula —OH or —NH—.

2. The process according to claim 1, wherein the alkylene oxide compound is a compound selected from the group consisting of ethylene oxide, propylene oxide, 1,2-butylene oxide and styrene oxide.

3. The process according to claim 2, wherein R in the phosphine oxide compound represented by the formula (1) may be the same or different and each represents an aliphatic hydrocarbon group having 1 to 8 carbon atoms.

4. The process according to claim 2, wherein R in the phosphine oxide compound represented by the formula (1) is a methyl group or an ethyl group.

5. The process according to claim 4, wherein x in the phosphine oxide compound represented by the formula (1) is within a range from 0 to 2.0.

6. The process according to claim 5, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

7. The process according to claim 5, wherein the organic compound having a partial structural formula —NH— as the active hydrogen compound is selected from polyamines having 2 to 20 carbon atoms and having 2 to 3 primary or secondary amino groups, saturated cyclic secondary amines having 4 to 10 carbon atoms, and cyclic polyamines having 4 to 10 carbon atoms and having 2 to 3 secondary amino groups.

8. The process according to claim 1, wherein R in the phosphine oxide compound represented by the formula (1) may be the same or different and each represents an aliphatic hydrocarbon group having 1 to 8 carbon atoms.

9. The process according to claim 8, wherein x in the phosphine oxide compound represented by the formula (1) is within a range from 0 to 2.0.

10. The process according to claim 9, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

11. The process according to claim 9, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

12. The process according to claim 1, wherein R in the phosphine oxide compound represented by the formula (1) is a methyl group or an ethyl group.

13. The process according to claim 12, wherein x in the phosphine oxide compound represented by the formula (1) is within a range from 0 to 2.0.

14. The process according to claim 13, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

15. The process according to claim 13, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

16. The process according to claim 3, wherein x in the phosphine oxide compound represented by the formula (1) is within a range from 0 to 2.0.

17. The process according to claim 16, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

18. The process according to claim 16, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

19. The process according to claim 2, wherein x in the phosphine oxide compound represented by the formula (1) is within a range from 0 to 2.0.

20. The process according to claim 19, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

21. The process according to claim 19, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

22. The process according to claim 1, wherein x in the phosphine oxide compound represented by the formula (1) is within a range from 0 to 2.0.

23. The process according to claim 22, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

24. The process according to claim 22, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

25. The process according to claim 12, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

26. The process according to claim 8, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

27. The process according to claim 4, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

28. The process according to claim 3, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

29. The process according to claim 2, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

30. The process according to claim 1, wherein the organic compound having a partial structural formula —OH as the active hydrogen compound is selected from alcohols having 1 to 20 carbon atoms, polyhydric alcohols having 2 to 20 carbon atoms and having 2 to 8 hydroxyl groups, saccharides or derivatives thereof, and poly(alkylene oxide)s having 2 to 8 terminal ends, which have 1 to 8 hydroxyl groups at the terminal end thereof and have a number-average molecular weight of 200 to 50,000.

31. The process according to claim 12, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

32. The process according to claim 8, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

33. The process according to claim 4, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

34. The process according to claim 3, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

35. The process according to claim 2, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

36. The process according to claim 1, wherein the organic compound having a partial structural formula —NH— as the active hydrogen compound is selected from polyamines having 2 to 20 carbon atoms and having 2 to 3 primary or secondary amino groups, saturated cyclic polyamines having 4 to 10 carbon atoms and having 2 to 3 secondary amino groups.

* * * * *

UNITED STATES PATENT AND TRADEMARK OFFICE
CERTIFICATE OF CORRECTION

PATENT NO.    : 6,255,537 B1
DATED         : July 3, 2001
INVENTOR(S)   : Takaomi Hayashi et al.

Page 1 of 1

It is certified that error appears in the above-identified patent and that said Letters Patent is hereby corrected as shown below:

<u>Title page,</u>
Item [56], FOREIGN PATENT DOCUMENTS, change "76355555 A2" to
-- 763555 A2 --; and change "07991600 A1" to -- 0791600 A1 --.

Signed and Sealed this

Seventh Day of May, 2002

Attest:

JAMES E. ROGAN
*Attesting Officer*   *Director of the United States Patent and Trademark Office*